United States Patent
Chiu et al.

(10) Patent No.: US 7,203,380 B2
(45) Date of Patent: Apr. 10, 2007

(54) VIDEO PRODUCTION AND COMPACTION WITH COLLAGE PICTURE FRAME USER INTERFACE

(75) Inventors: Patrick Chiu, Menlo Park, CA (US); Shingo Uchihashi, Kanagawa (JP); John S. Boreczky, San Leandro, CA (US); Jonathan T. Foote, Menlo Park, CA (US); Andreas Girgensohn, Menlo Park, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 814 days.

(21) Appl. No.: 09/992,617

(22) Filed: Nov. 16, 2001

(65) Prior Publication Data
US 2003/0095720 A1    May 22, 2003

(51) Int. Cl.
G06K 9/36 (2006.01)

(52) U.S. Cl. .................. 382/284; 382/282; 382/294; 345/723

(58) Field of Classification Search ........ 382/171, 382/209, 217, 282, 284, 294, 173; 348/97, 348/100, 154, 14.07, 14.13, 14.15, 723; 345/719, 345/723, 724; 358/538, 540, 450
See application file for complete search history.

(56) References Cited

U.S. PATENT DOCUMENTS

| | | | | |
|---|---|---|---|---|
| 4,717,971 A | * | 1/1988 | Sawyer ..................... | 386/55 |
| 5,048,095 A | * | 9/1991 | Bhanu et al. .............. | 382/173 |
| 5,521,841 A | * | 5/1996 | Arman et al. .............. | 715/723 |
| 5,576,950 A | * | 11/1996 | Tonomura et al. .......... | 386/121 |
| 5,592,228 A | * | 1/1997 | Dachiku et al. ........... | 348/416.1 |
| 5,636,957 A | * | 6/1997 | Hefty ....................... | 412/1 |
| 5,751,281 A | * | 5/1998 | Hoddie et al. ............. | 715/500.1 |
| 5,784,461 A | * | 7/1998 | Shaffer et al. ............ | 705/51 |
| 5,809,202 A | * | 9/1998 | Gotoh et al. .............. | 386/69 |
| 5,828,809 A | * | 10/1998 | Chang et al. .............. | 386/69 |
| 5,995,095 A | * | 11/1999 | Ratakonda ................. | 715/500.1 |
| 6,014,183 A | * | 1/2000 | Hoang ...................... | 348/702 |
| 6,072,542 A | * | 6/2000 | Wilcox et al. ............. | 348/722 |
| 6,097,389 A | * | 8/2000 | Morris et al. ............. | 715/804 |
| 6,098,082 A | * | 8/2000 | Gibbon et al. ............. | 715/501.1 |
| 6,111,586 A | * | 8/2000 | Ikeda et al. ............... | 15/79.1 |
| 6,123,362 A | * | 9/2000 | Squilla et al. ............ | 283/67 |

(Continued)

OTHER PUBLICATIONS

Pending U.S. Appl. No. 09/267,529, filed Mar. 12, 1999, Shingo Uchihachi.

(Continued)

*Primary Examiner*—Matthew C. Bella
*Assistant Examiner*—Yosef Kassa
(74) *Attorney, Agent, or Firm*—Fliesler Meyer LLP

(57) ABSTRACT

A method, system, and apparatus for easily creating a video collage from a video is provided. By segmenting the video into a set number of video segments and providing an interface for a user to select images which represent the video segments and insert the selected images into a video collage template, a video collage may be easily created in a short amount of time. The system is designed to assign values to the video inserted in a video collage and compact the video based on these values thereby creating a small file which may be easily stored or transmitted.

31 Claims, 9 Drawing Sheets

U.S. PATENT DOCUMENTS

| | | | |
|---|---|---|---|
| 6,195,458 B1 * | 2/2001 | Warnick et al. | 382/173 |
| 6,307,550 B1 * | 10/2001 | Chen et al. | 345/418 |
| 6,383,080 B1 * | 5/2002 | Link et al. | 463/47 |
| 6,396,963 B2 * | 5/2002 | Shaffer et al. | 382/305 |
| 6,400,890 B1 * | 6/2002 | Nagasaka et al. | 386/69 |
| 6,535,639 B1 * | 3/2003 | Uchihachi et al. | 382/225 |
| 6,608,563 B2 * | 8/2003 | Weston et al. | 340/573.1 |
| 6,636,220 B1 * | 10/2003 | Szeliski et al. | 345/475 |
| 6,741,864 B2 * | 5/2004 | Wilcock et al. | 455/456.1 |
| 6,791,601 B1 * | 9/2004 | Chang et al. | 348/65 |
| 6,819,795 B1 * | 11/2004 | Chiu et al. | 382/173 |
| 6,882,793 B1 * | 4/2005 | Fu et al. | 386/95 |

OTHER PUBLICATIONS

Pending U.S. Appl. No. 09/611,389, filed Jul. 7, 2000, Patrick Chiu.

Pending U.S. Appl. No. 09/618,533, filed Jul. 18, 2000, Andreas Girgensohn.

Pending U.S. Appl. No. 09/618,649, filed Jul. 18, 2000, Andreas Girgensohn.

*Adobe Premiere*, (printed Nov. 7, 2001) <http://www.adobe.com/products/premiere/>.

*Apple iMovie*, (printed Nov. 7, 2001) <http://www.apple.com/imovie/>.

Patrick Chiu et al., *A Genetic Algorithm for Video Segmentation and Summarization*, ICME (IEEE Multimedia) vol. III, pp. 1329-1332, (2000).

Andreas Girgensohn et al., *A Semi-Automatic Approach to Home Video Editing*, UIST '00, ACM Press, pp. 81-89, (2000).

*In-Sync Speed Razor*, (printed Nov. 7, 2001) <http://www.in-sync.com/>.

*Javu Technologies JavuNetwork*, (printed Nov. 7, 2001), <http://www.javu.com/>.

Allan Kuchinsky et al., *FotoFile: A Consumer Multimedia Organization and Retrieval System*, CHI '99, ACM Press, pp. 496-503, (1999).

Shingo Uchihashi et al., *Summarizing Video Using a Shot Importance Measure and a Frame-Packing Algorithm* ICASSP '99, vol. 6, pp. 3041-3044, (1999).

Shingo Uchihashi et al., *Video Manga: Generating Semantically Meaningful Video Summaries*, ACM Multimedia '99, ACM Press, pp. 383-392, (1999).

\* cited by examiner

| Segment | Length (sec.) | Area Of Video Frame | |a| | % Compacted By Constraint (2) | Compacted Length (sec.) | % Compacted By Constraint (3) | Compacted Length (sec.) |
|---|---|---|---|---|---|---|---|
| 921 | 28.00 | 1.50 | 1.18 | 74% | 7.28 | 45% | 15.30 |
| 923 | 1.00 | 1.50 | 0.86 | 0% | 1.00 | 0% | 1.00 |
| 925 | 17.50 | 6.88 | 0.80 | 0% | 17.50 | 0% | 17.50 |
| 927 | 24.00 | 2.25 | 1.00 | 55% | 10.80 | 22% | 18.75 |
| 929 | 12.50 | 2.25 | 0.12 | 52% | 6.00 | 16% | 10.50 |
| Total | 83.00 | | | 49% | 42.58 | 24% | 63.05 |

Fig. 9

VIDEO PRODUCTION AND COMPACTION WITH COLLAGE PICTURE FRAME USER INTERFACE

FIELD OF THE INVENTION

The present invention is related to the field of video production and editing.

BACKGROUND

Video cameras are becoming increasingly popular for home, office, and other types of use. For example, video cameras are frequently used to document family events such as vacations, weddings, and graduation ceremonies. In the office, video cameras are often used to record presentations, meetings, user studies and field work, and are often taken on business trips to record people, places, and activities.

Recently systems have been developed to interface personal computers with video cameras so that video can be stored in the memory of personal computers. As a result of this ability to transfer video from video tapes, capture cards, and/or memory sticks, in a multitude of different formats to personal computers, there is an increasing demand for storing, viewing, editing, and transmitting video.

While unedited videos may often be viewed once or twice, they are often stored away since the interesting parts are generally intermixed with longer, less interesting regions. Further, unedited video is often of poor quality resulting from abrupt camera movement or too short or too long views, making it uninteresting to watch while waiting for the next interesting section.

In addition to unedited video often being long and boring, the amount of memory required to store the information is often rather large. A typical unedited video file may often range from a few bytes to hundreds of megabytes. Not only does unedited video often consume large amounts of memory, transmitting the video using e-mail or other electronic transmission systems is often difficult and slow.

Current systems for editing video, such as Adobe Premiere®, are designed for professional video producers and often take hours to assemble and mix video and audio tracks to produce an edited video. Other systems, such as the one described in commonly owned co-pending U.S. patent application Ser. No. 09/618,533 entitled "Interactive Custom Video Creation System," filed Jul. 18, 2000, which is herein incorporated by reference, are easer to use but still require large amounts of user interaction to generate an edited video.

Until now, if a user wanted to electronically transmit a video, they either had to send the entire video or spend several hours creating an edited video and then send the edited video. While professionally editing video may be necessary in some circumstances, it is often undesirable and too time consuming.

Therefore, it is desirable to produce a system and method which segments video with a reduced amount of user input and provides the ability for a user to easily select portions of the video for viewing, storing, and or transmitting.

SUMMARY

Roughly described, the invention comprises a method for producing a video collage. The method may include segmenting a video into a plurality of video segments, providing a video collage template having at least one individual video frame, and associating a video segment from said plurality of video segments with said individual video frame of said video collage template. After the video segment has been associated with the video collage template the system generates a video collage from the video collage template and the associated video segment.

In one aspect, the invention comprises a video collage which includes a template having at least one individual video frame, and a representative image associated with a video segment, wherein said representative image is contained in said at least one individual video frame.

In a further aspect, the invention comprises a video collage user interface. The video collage user interface may include a video collage template having at least one individual video frame, a video segment template having a plurality of representative images, and a video segment selection device. Each of the representative images of the video segment template represent a video segment.

According to another aspect, the invention may comprise an apparatus for producing a video collage. The apparatus may include a processor and a processor readable storage medium in communication with the processor, containing processor readable program code. The processor readable program code programs the apparatus to segment a video into a plurality of video segments, provide a video collage template having at least one individual video frame, and associate a video segment from said plurality of video segments with said individual video frame of said video collage template.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Figure 1:
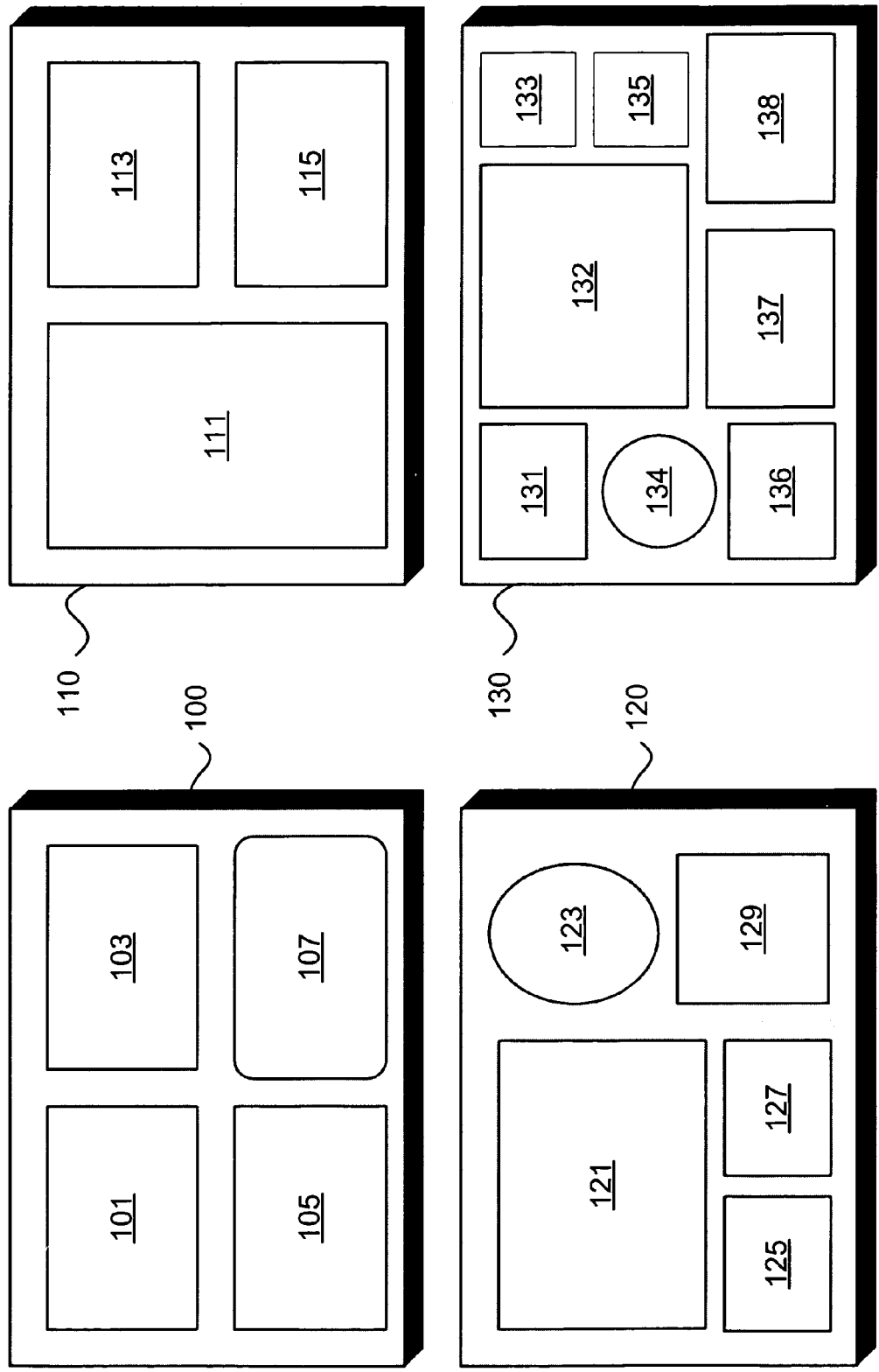
FIG. 1 illustrates an example of four video collage templates for inserting and arranging video segments, according to an embodiment of the present invention.

FIG. 1 illustrates an example of four video collage templates 1100, 110, 120, and 130 for inserting and arranging video segments, according to an embodiment of the present invention. Each video collage template includes individual video frames for inserting video segments. For example, video collage template 100 contains individual video frames 101, 103, 105, and 107; video collage template 1110 contains individual video frames 111, 113, and 115; video collage template 120 contains individual video frames 121, 123, 125, 127, and 129; and video collage template 130 contains individual video frames 131, 132, 133, 134, 135, 136, 137, and 138. The individual video frames maybe of any shape or size, constrained only by the size of the video collage template. For example, an individual video frame may be oval, such as individual video frame 123, round, such as individual video frame 134, or any other shape. Additionally, there is no required number of individual video frames. A video collage user interface may have one, two, three, or any other number of individual video frames.

A video collage template maybe provided by the system or maybe created by a user. For example, a video collage template may be generated using Microsoft PowerPoint®, Microsoft Visio®, Microsoft Paint®, Corel Draw®, Deneba Systems, Inc.'s Canvast, or any other type of drawing application, and stored in memory as an electronic file. Once a video collage template is created it may be shared with other users and stored as an electronic file.

Figure 2:
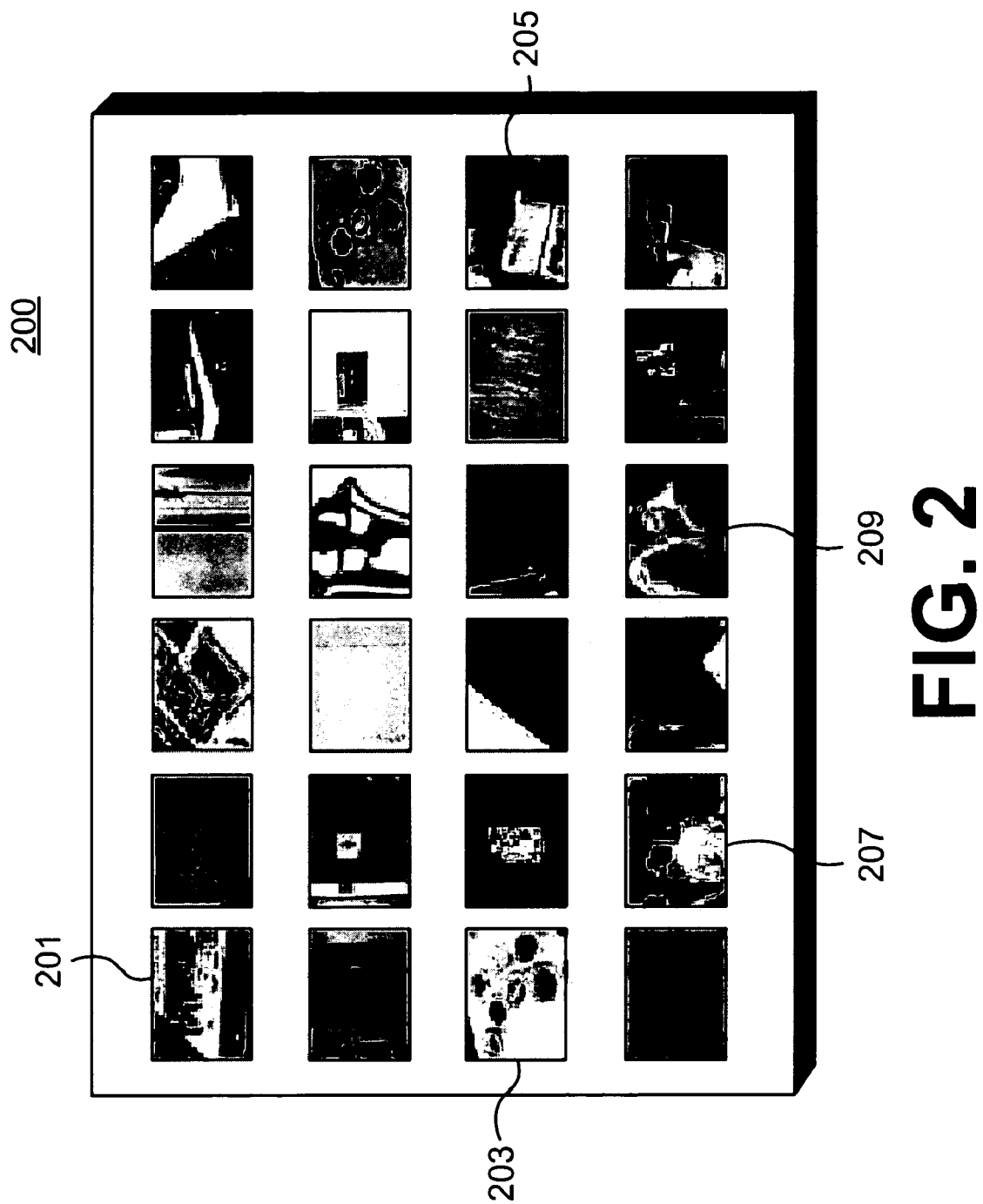
FIG. 2 illustrates a video segment template, according to an embodiment of the present invention.

FIG. 2 illustrates a video segment template 200, according to an embodiment of the present invention. Video segment template 200 includes representative images of associated segments of a video, such as representative images 201, 203, 205, 207, and 209. Video is segmented into a predetermined number of segments and a representative image for each segment is selected and associated with that particular segment. The representative images may be displayed to a user using video segment template 200.

The representative image for each video segment may be determined in a variety of ways. For example, representative image 201 may be determined by using the image contained in the first frame of the associated video segment. Alternatively, an image analysis algorithm may be applied to each frame of the video segment and a determination made as to which frame best represents the video segment and the image of the most representative frame displayed as the representative image. In another example, a user may view the video segment and select a scene or frame from the video segment and have the image from the selected scene or frame used as the representative image.

Figure 3:
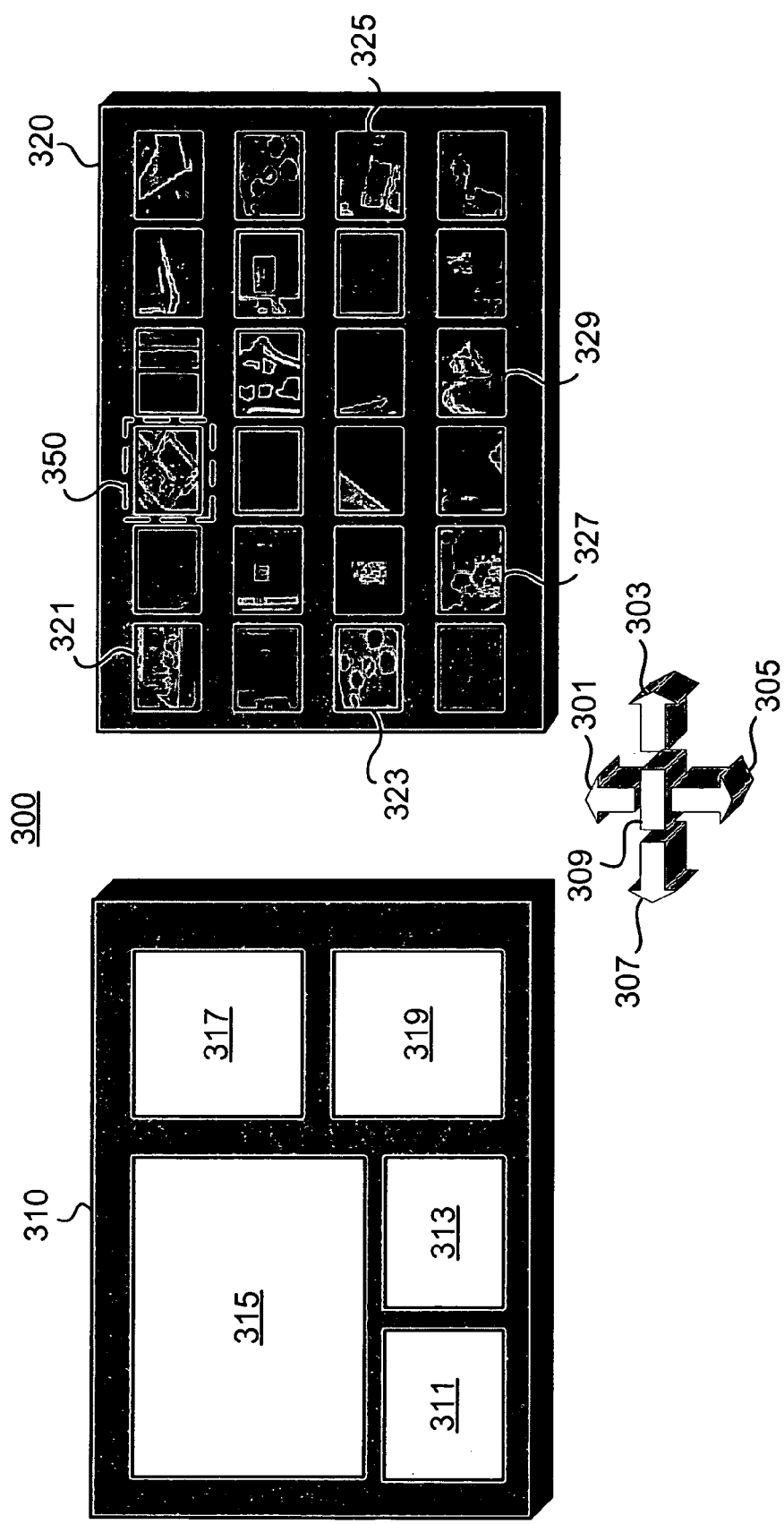
FIG. 3 illustrates an example of a user interface for creating a video collage, according to an embodiment of the present invention.

FIG. 3 illustrates a video collage user interface 300, according to an embodiment of the present invention. Video collage user interface 300 contains a user selected video collage template 310 and a video segment template 320 containing representative images of a segmented video, such as representative images 321, 323, 325, 327 and 329. Video collage user interface 300 may also include a group of controller mechanisms 301, 303, 305, 307, and 309 which may be used to perform various functions. For example, a user may select a representative image, such as representative image 323, from video segment template 320 using the arrow buttons 301, 303, 305, and 307 to position a selection box 350 around representative image 323 and activating a select mechanism 309. Additionally, a user may play a video segment associated with representative image 323 by again activating the select mechanism 309. Alternatively, once a representative image has been selected a user may position the selected representative image into a video frame of video collage template 310 using the controller mechanisms 301, 303, 305, 307, and 309.

Figure 5:
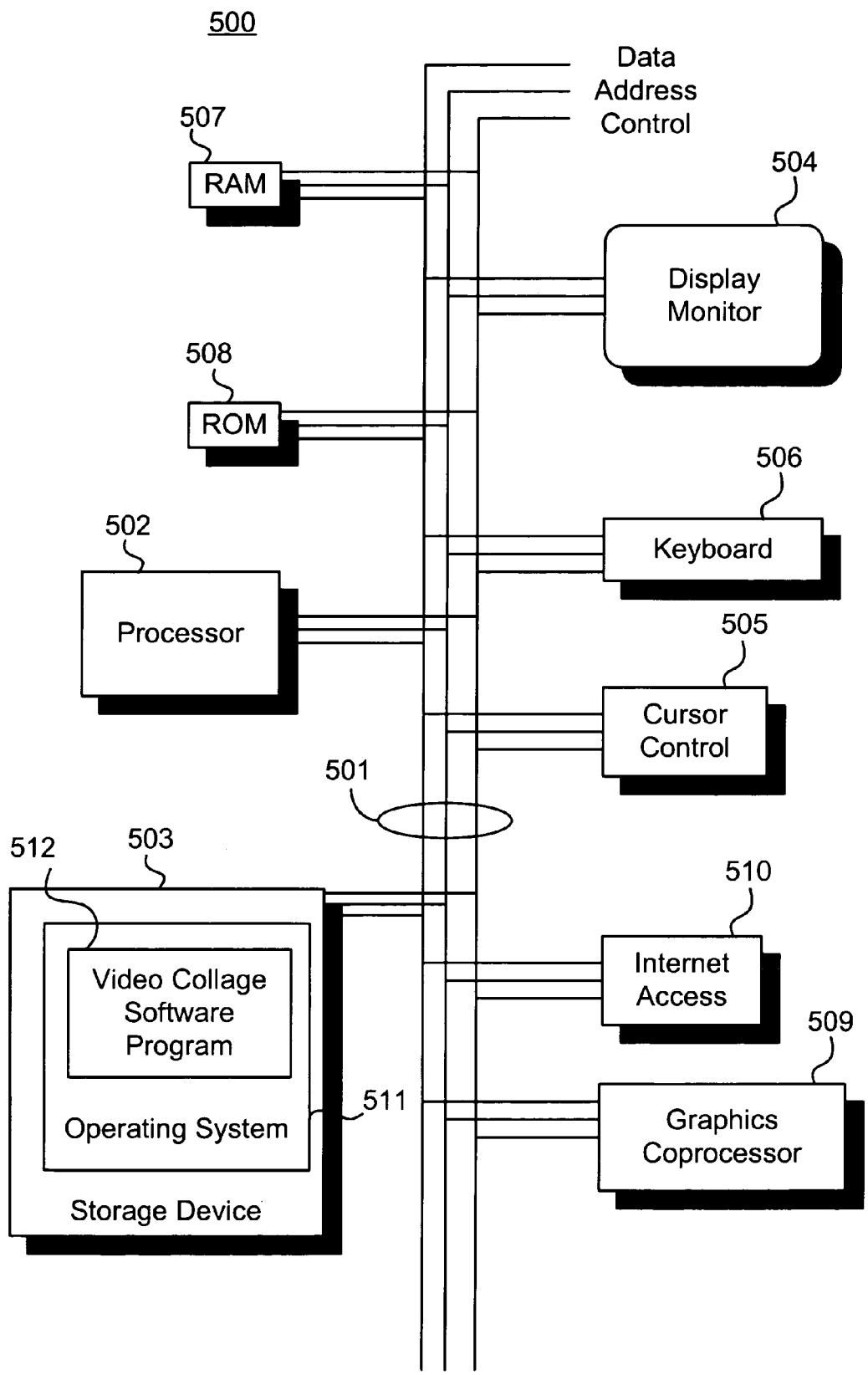
FIG. 5 is a generalized block diagram illustrating a computing device architecture suitable for implementing various embodiments of the present invention.

Inserting a representative image into an individual frame of video collage template 310 will result in the representative image being displayed in the inserted video frame. The video segment associated with the representative image may be viewed by selecting the representative image. The associated video segment may be played in the individual video frame which contains the associated representative image, may be played in an individual "window," or may be played so as to fill an entire viewing area of a viewing device, such as display monitor 504 (FIG. 5).

The controller mechanisms 301, 303, 305, 307, and 309, and selection box 350, are used for illustrative purposes only and any other technique for selecting, viewing and positioning representative images and associated video segments may be used. For example, a user may perform these functions using any pointing device, such as a cursor control device 505 (FIG. 5), by selecting the representative image using a touch sensitive display screen, using keystrokes on a keyboard 506, etc.

Figure 4:
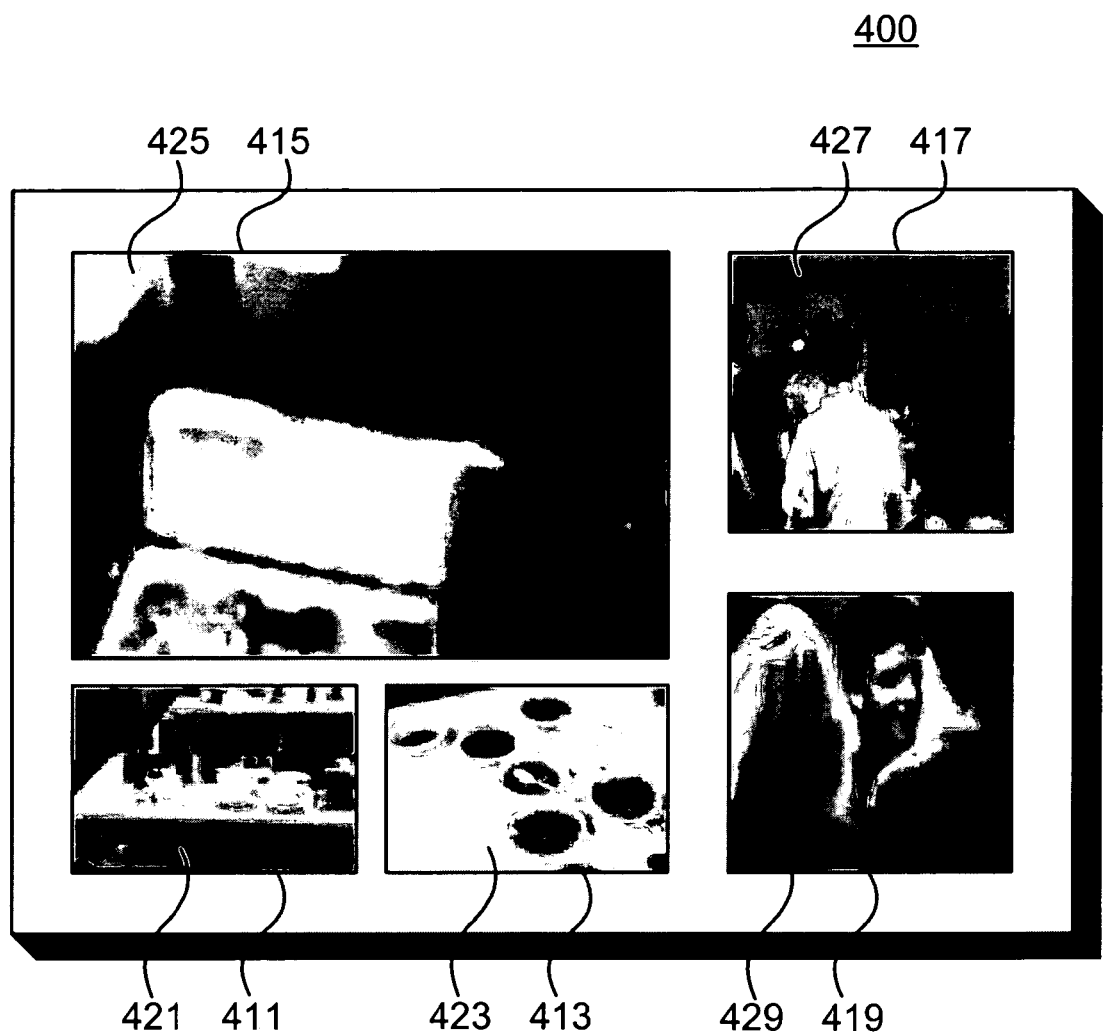
FIG. 4 illustrates an example of a video collage containing five selected representative images of video segments, according to an embodiment of the present invention.

FIG. 4 illustrates an example of a video collage 400, according to an embodiment of the present invention. Video collage 400 is generated using video collage user interface 300 (FIG. 3). In generating video collage 400 a user selects and inserts representative image 321 into individual video frame 311, resulting in representative image 421 contained in video frame 411, selects and inserts representative image 323 into individual video frame 313, resulting in representative image 423 contained in video frame 413, selects and inserts representative image 325 into individual video frame 315, resulting in representative image 425 contained in video frame 415, selects and inserts representative image 327 into individual video frame 317, resulting in representative image 427 contained in video frame 417, and selects and inserts representative image 329 into individual video frame 319, resulting in representative image 429 contained in video frame 419, of video collage 400.

Once video collage 400 has been generated it may be saved as an individual electronic file containing information relating to the arrangement and display of video collage 400 with selected representative images. Additionally, the file may contain video segments associated with the selected representative images.

In an alternative embodiment, the video collage or selected representative images may contain a link to a location where the associated video segments are stored. For example, if the video is available over the Internet, the electronic file may contain only information for displaying the video collage 400 with the representative image and a link to a location for each video segment associated with a representative image. In such an example, if a representative image from video collage 400 is selected, the associated video segment is streamed over the Internet and displayed to the user. Including a link in the electronic file to each associated video segment provides the ability to store and transmit an electronic file of video collage 400 which is very small in size.

The electronic file of video collage 400 may be of any file type which is capable of being viewed, stored, and/or transmitted by a user. For example, an electronic file of video collage 400 may be saved as Moving Picture Experts Group ("MPEG") file, Audio Video Interleave ("AVI") file, Digital Video ("DV") file, QuickTime file, or any other video file format.

Once the video collage 400 has been generated, a user may display the video collage 400 on a web site, transmit the collage to others using email or other transmission devices, save the video collage as an electronic file, print a copy of the video collage, create Digital Video Discs ("DVD"), Video Compact Discs ("VCD"), Compact Discs ("CD"), etc.

While the scope of the present invention extends far beyond use with the Internet, the Internet is used to exemplify embodiments of the present invention. Alternatively, embodiments of the present invention may be implemented on any type of end-to-end communication channel. For example, embodiments of the present invention may be implemented to function with an instant messaging system, an internal network, such as a Local Area Network ("LAN"), or over a peer-to-peer network.

FIG. 5 illustrates a computing device architecture 500 suitable for implementing embodiments of the present invention. The computing device architecture 500 includes a processor 502, a storage device 503, Internet access equipment 510, such as a modem, and a display monitor 504. The architecture 500 may also include cursor control device 505, Random Access Memory ("RAM") 507, Read Only Memory ("ROM") 508, keyboard 506, and a graphics co-processor 509. All of the elements of the computing device architecture 500 may be tied together by a common bus 501 for transporting data between the various elements. The bus 501 typically includes data, address, and control signals.

Embodiments of the present invention are executable on any computing device architecture such as the one 500 illustrated in FIG. 5, but there is no limitation that this architecture is the only one which can execute embodiments of the present invention.

In an embodiment of the present invention, the storage device 503 may be an article of manufacture, such as a computer readable medium. For example, storage device 503 maybe a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

Storage device 503 may include an operating system 511, such as Microsoft Windows®, Apple Macintosh OS®, or Unix®, wherein the operating system 511 is capable of executing programs or applications using computing device architecture 500. An embodiment of the present invention is implemented as video collage software program 512, and is stored on storage device 503.

As will be understood, embodiments of the present invention, such as video collage software program 512, maybe in the form of a software program, a software object, a software function, a software subroutine, a software method, a software instance, a code fragment, a hardware operation or user operation, singly or in combination. Additionally, video collage software program 512 may be implemented using one, two, or any number of computing devices 500.

Figure 6:
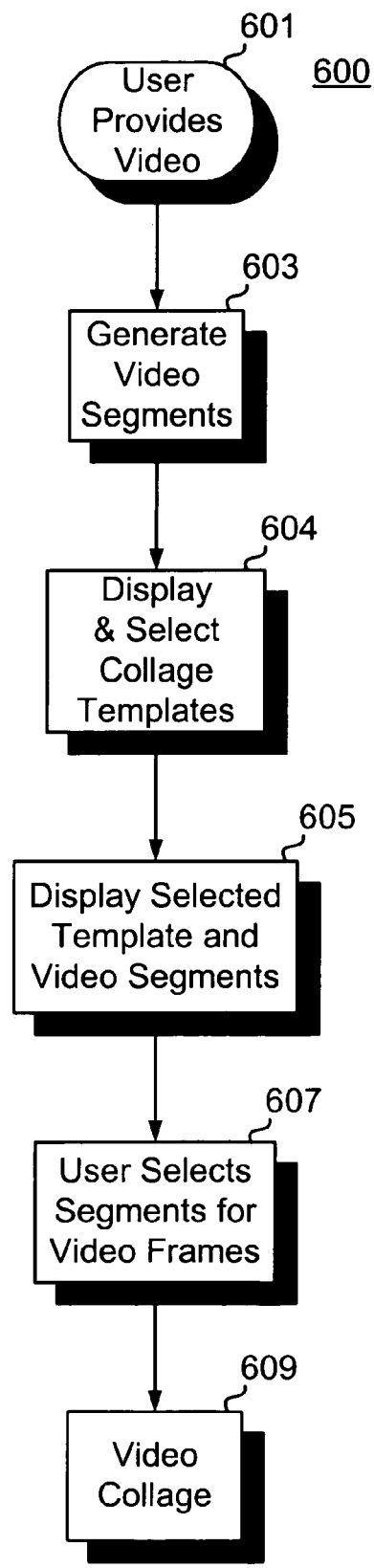
FIG. 6 is a flow chart illustrating the steps for generating a video collage layout, according to an embodiment of the present invention.

FIG. 6 is a flow chart 600 illustrating a general view of the steps for generating a video collage layout, according to an embodiment of the present invention.

Figure 7:
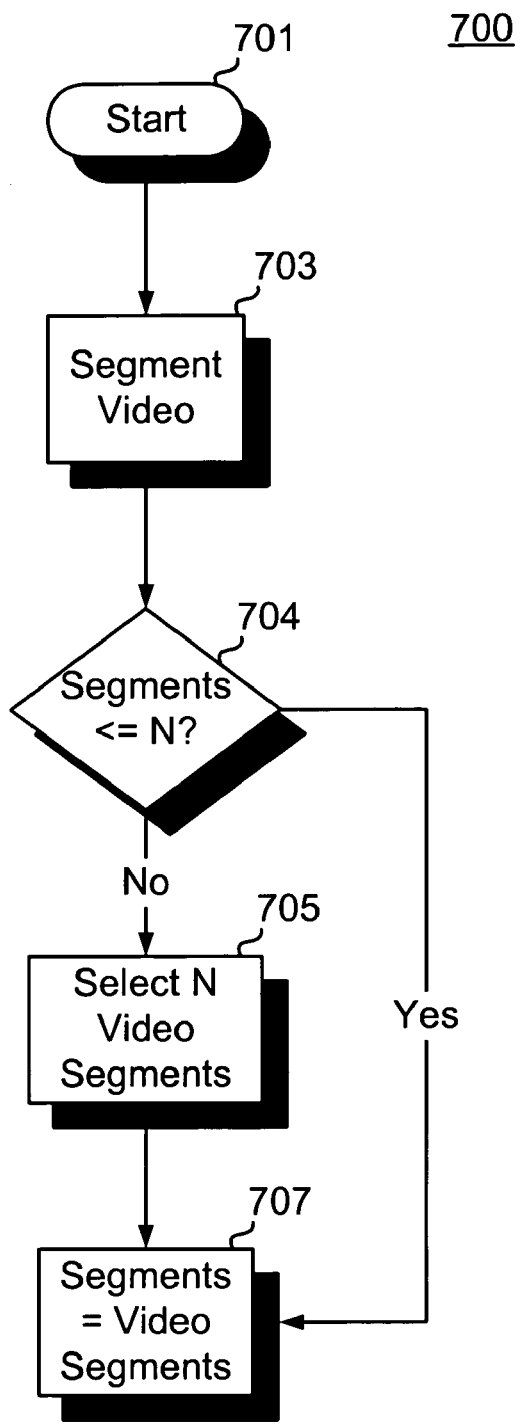
FIG. 7 is a flow chart illustrating the steps for generating video segments, according to an embodiment of the present invention.
Figure 8:
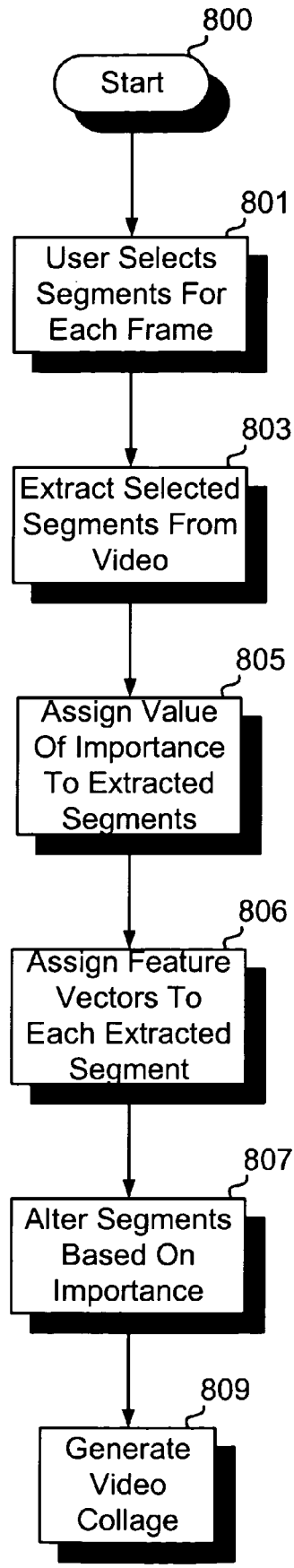
FIG. 8 is a flow chart illustrating the general steps for extracting and altering selected video segments; and, FIG. 9 is a table illustrating an example of video compaction, according to an embodiment of the present invention.

As one who is skilled in the art would appreciate, FIGS. 6, 7, and 8 illustrate logic boxes for performing specific functions. In alternative embodiments, more or fewer logic boxes may be used. In an embodiment of the present invention, a logic box may represent a software program, a software object, a software function, a software subroutine, a software method, a software instance, a code fragment, a hardware operation or user operation, singly or in combination. For example, a logic box may represent a portion of video collage software program 512 illustrated in FIG. 5, or any portion of other embodiments of the present invention.

In logic box 601 a user initiates the system and provides a video which they desire to use for generating a video collage layout. Upon receipt of a video, control is passed to logic box 603.

In logic box 603 the system generates a set of video segments from the provided video. The set of video seg-
ments will contain a predefined number of segments from the video. In an embodiment, a user may select how many video segments the video is to be divided into. Alternatively, a preset number may be used for segmenting the video. In still another embodiment, the system may determine the length of the provided video and select a segmentation number based on the length.

In logic box 604 a set of predefined video collage templates, such as video collage templates 100, 110, 120, and 130 (FIG. 1) are displayed to a user and one of the templates is selected. Alternatively, a user may generate and use their own video collage template.

In logic box 605 a video collage user interface is displayed to a user. The video collage user interface, such as the one 300 described with respect to FIG. 3, includes the video collage temple selected in logic box 604 and a video segment temple 200 (FIG. 2) containing representative images associated with each video segment generated in logic box 603.

A user, as illustrated by logic box 607, selects segments from the video segment template and inserts them into desired individual frames of the selected video collage template. Once each of the individual frames of the video collage template have been filled, or the user has indicated to the system that they have completed filling the individual frames of the video collage template, control is passed to logic box 609 and a video collage is generated from the selected video collage template and the selected representative images.

FIG. 7 is a flow chart illustrating the steps for generating video segments illustrated as logic box 603 (FIG. 6), according to an embodiment of the present invention.

Video segmentation is begun in logic box 701 in response to providing a video. For example purposes we will describe video segmentation as illustrated by flow chart 700 using a video taken at an ice cream social which is originally fourteen minutes long.

Once a video is provided, initial video segmentation may be performed, as illustrated by logic box 703. Initial video segmentation may be performed using a number of well-known video segmentation techniques. For example, video may be segmented by "shots." A "shot" is defined as the time from which a video camera is turned to record to the time to which the record is turned off. Alternatively, algorithms for detecting scene changes maybe used. Shots and scenes may also be segmented manually.

Once the video is initially segmented, control is passed to logic box 704 and a determination is made as to whether the number of segments generated in logic box 703 is less than or equal to the number of segments ("N") which are to be provided to a user for selection. The number N of segments which are to be provided to a user for selection may be a predefined number, or a number provided by a user. If it is determined that the number of segments of video generated in logic box 703 is less than or equal to N, control is passed to logic box 707 and the video segments are used as the video segments to be provided to the user. However, if the number of video segments is not less than or equal to N, control is passed to logic box 705.

Referring to the ice cream social video example, the video is initially segmented into 179 segments using a typical color difference algorithm. Such an algorithm segments video based on color differences among frames. Any other typical segmentation algorithm may be used to initially segment the video. Since this is too many for a user to deal with quickly and easily, and N is set to 24, controlled is passed to logic box 705 where a smaller set of segments are generated.

In logic box 705, N video segments are selected from the set of video segments generated in logic box 703. For explanation purposes the set of N video segments may be referred to herein as S(N). The set S(N) will include the segments which are most representative of the entire video.

Video segment selection, as described in logic box 705, may be performed using a variety of video segmentation techniques. For example, N video segments may be selected using the Genetic Segmentation Algorithm ("GSA") described in commonly owned co-pending U.S. patent application Ser. No. 09/611,389 entitled "A Genetic Segmentation Method for Data, Such As Image Data Streams," filed Jul. 7, 2000, which is herein incorporated by reference. Another technique for selecting segments is to look at histogram differences of adjacent frames and setting a threshold so that the places with differences exceeding the threshold are deemed to be segment boundaries.

Once N segments have been selected, control is passed to logic box 707 and the set of N video segments is used as the set of video segments provided to the user.

In an alternative embodiment, logic boxes 703 through 705 may be combined. In such an example, an initial segmentation will be performed on the video which returns a predetermined number N of video segments. Segmentation may be performed using GSA, where GSA is provided with N. GSA segments the entire video into N segments which are used as the video segments provided to the user in logic box 707.

FIG. 8 is a flow chart illustrating the general steps for extracting and altering selected video segments for generating a video collage, as illustrated by logic boxes 607 and 609 (FIG. 6), according to an embodiment of the present invention.

The process begins at logic box 800 and control is passed to logic box 801, where a user selects representative images of associated video segments for each frame of a video collage template using any of the techniques described above. Once representative images for associated video have been selected and inserted into individual video frames of a video collage template, control is passed to logic box 803.

In logic box 803 each video segment associated with the selected representative image is extracted from the video using any video extraction technique known in the art. For explanation purposes the set of extracted video frames maybe referred to herein as U(k), where U(k)={$s_0$, $s_1$, $s_2$, . . . , $s_{k-1}$}, wherein k is the number of user selected segments. Once each video segment is extracted control is passed to logic box 805.

In logic box 805 an importance value is assigned to each extracted video segment. In an embodiment, the segments assigned to larger individual video frames in the video collage are assigned a higher importance value while video assigned to smaller video frames are assigned a lower importance value. Alternatively, a user may assign an importance value to the selected video segments.

In logic block 806 each segment is associated with a "feature vector" (also referred to herein as "a s)") to characterize content activity. Examples of content activity features are: (1) length of the segment; (2) changes in a medium over time (visual, audio, and text), etc. Assigning a feature vector to each video segment provides another feature for adjusting video segments. Providing another feature removes the problem of linearly mapping the lengths of video segments to the sizes of the individual video frames.

Linearly mapping video segments to frame size is a problem when a short segment is assigned to a large frame, forcing the other video segments to be much too short.

An example of defining a feature vector will be described with respect to visual changes between frames of a segment. Visual changes may be determined by finding color histogram differences using the formula f(s)=number of different frames (F") that appears in a segment s, where f(s) is a value for the visual changes.

Motion caused by a pan will typically give a high f(s), a zoom will generally yield a lower f(s), a still camera on a still object will give a zero f(s). Since a still camera on a moving object with a uniform background may generate a low f(s), edge detection techniques may be performed on the images to properly adjust f(s). Edge detection techniques are known in the art and will not be explained in further detail.

The feature vector may take into account both normalized visual changes and the length of the video segment by using the following formula to define the feature vector:

$$a(s) = a_1, a_2 = \left( \frac{f(s)}{\max\{f(s)|s \in U(k)\}}, \frac{\text{length}(s)}{\max\{\text{length}(s)|s \in U(k)\}} \right) \quad (1)$$

and $$|a(s)| = \sqrt{a_1^2 + a_2^2}.$$

Feature vectors may be modified to have other components by adding other features. For example, audio features may be added by sampling the audio of a video segment (e.g. every 10 ms) and determining energy differences. For text features, which may be beneficial to use when there is a transcript (e.g. close caption feed) or text extracted by Optical Character Recognition ("OCR") from presentation slides, the text stream maybe sampled and a determination made as to the changes in the rate of text.

Once an importance value is assigned to each selected video segment (logic box 805) and a feature vector which takes into account the importance value and content activity is associated with the video segment (logic box 806) control is passed to logic box 807.

In logic box 807 the selected video segments may be altered to reduce the size of the resulting electronic file and/or to eliminate any remaining uninteresting portions of the video segments. To ease explanation of video alteration we will refer to the feature vectors as being normalized so that they are contained within a sphere having a radius bounded by the longest of the feature vectors.

Each feature vector is shortened so that the square of its length relative to the bounding radius is at most the size of its prescribed video frame relative to other video frames in the video collage template. Thus, by solving the following formula a determination may be made with respect to the video segments, associated feature vectors, and the corresponding individual video frame, as to how much to compact each video segment with respect to the other selected video segments:

$$\frac{|a(s)|}{|a_{\max}|} \leq \frac{A(s)}{A_{\max}}, \quad (2)$$

or $$|a(s)| \leq |a_{\max}| \frac{A(s)}{A_{\max}}.$$

Each video segment s that satisfies this constraint is left alone, and video segments which do not satisfy this constraint are adjusted until the constraint is true. In an embodiment, the video segments are adjusted by truncating the video from the end of the segment toward the beginning until the constraint is satisfied. Since $|a(s)|$ can be parameterized by time as $|a(s(t))|$, and is an increasing function of t, as t goes from 0 to T, where T is the length of the segment, there will be a smallest point t* where the constraint is satisfied. One method for determining t* is to recursively search the two halves of the term interval [0,T].

The segment s assigned to the largest individual frame (with $A(s)=A_{max}$) does not need to be adjusted (i.e. truncated), because this segment will always satisfy the constraint, i.e.:

$$|a(s)| \le |a_{max}| \frac{A(s)}{A_{max}} = |a_{max}|.$$

Hence, the resulting video collage will have the segment that a user prescribed as the most important (e.g. by placing the video segment in the largest individual frame) shown in its entirety. Video compaction techniques, other than truncation, may also be used to reduce the size of the video segments. For example, another compaction technique is to time warp the segment (e.g. setting playback parameters so that it will speed up playback by a factor of p, where p is a number greater than 1.0).

Once the segments have been adjusted, as described above, control is passed to logic box 809 and a video collage is generated.

In an alternative embodiment, information retrieval ideas my be incorporated into the definition of the feature vector a(s). Such information retrieval ideas may be term frequency, inverse document frequence, ("tf*idf"). An example of this for video applications is described in Summarizing video using a shot importance measure and a frame-packing algorithm, Uchihashi, S., et. al., Proceedings ICAASP '99, vol. 6, pp. 3041–3044, which relies on hierarchical clustering of features, such as color; and in A genetic algorithm for video segmentation and summarization, Chiu, P., et al., Proceedings of ICME (IEEE Multimedia) 2000. In each of these papers, the value incorporated into the feature vector is referred to as "importance."

In such a variation we first define a set $C_s$ to be those elements similar to a segment s in U(k), where:

$C_S = \{s \in U(k) | h(s,u) < \overline{dh} + \sigma, \forall u \in U(k)\}$ where h(s,u) is defined by the histogram difference between the first frames of s and u in U(k), $\overline{dh(u)}$ is defined by the histogram difference between the first frames of u and its next segment (in time) in U(k), and the mean $\overline{dh}$ of dh and standard deviation $\sigma$ of dh is computed over U(k). In this formulation, we are only using visual features but it can be extended to include other types of features and media, such as audio. With the above description we define:

$$idf(s) = \log\left(\frac{1+k}{1+|C_s|}\right).$$

idj(s) can be normalized to be between 0 and 1 by dividing by a factor $C_{idf}=\log((1+k)/2)$. Next, this normalized equation is multiplied with the length term of each segment to obtain a variation of the feature vector:

$$a(s) = (a_1, a_2) = \left(\frac{f(s)}{\max\{f(s) | s \in U(k)\}}, \frac{\text{length}(s)}{L * C_{idf} * idf}\right)$$

In an alternative embodiment, to produce less truncation of the segmented video the constraint maybe modified by determining the radius of each corresponding individual video frame. This can be done by taking the square root of the areas, or taking the square of the vector lengths for each video segment. In such an embodiment the following equation is utilized for determining segment adjustment:

$$\frac{|a(s)|^2}{|a_{max}|^2} \le \frac{A(s)}{A_{max}}. \quad (3)$$

FIG. 9 illustrates an example of the amount of truncation which occurs using the above techniques for adjusting video, according to an embodiment of the present invention. In particular, the table in FIG. 9 relates to the ice cream social video example. In this example, the system segments the ice cream video into twenty four segments and displays them through a video segment template included in the video collage user interface (FIG. 3). After user selection, the resulting video collage is illustrated as video collage 400 (FIG. 4). The segments 921, 923, 925, 927, and 929 correspond to the video segments associated with representative images 421, 423, 425, 427, and 429, respectively.

The table 900 illustrated in FIG. 9 includes eight columns 901, 902, 903, 904, 905, 906, 907, and 908. Column 901 identifies each of the selected video segments 921, 923, 925, 927, and 929; Column 902 identifies the length in seconds of each selected video segment 921, 923, 925, 927, and 929; Column 903 identifies the area of each of the corresponding individual video frames 411, 413, 415, 417, and 419 (FIG. 4); Column 904 identifies the length of the computed feature vector for each selected video segment 921, 923, 925, 927, and 929; Column 905 identifies the percent each selected video segment 921, 923, 925, 927, and 929 is compacted using equation (2); Column 906 identifies the compacted length in seconds of each selected video segment 921,923, 925, 927, and 929 using equation (2); Column 907 identifies the percent each selected video segment 921, 923, 925, 927, and 929 is compacted by using equation (3); and column 908 identifies the compacted length in seconds of each selected video segment 921, 923, 925, 927, and 929 using equation (3).

As can be seen from table 900, $\alpha_{max}=1.18$ and relates to video segment 921, and $A_{max}=6.88$ and relates to individual video frame 415 which contains a representative image 425 of video segment 925. In this example, the five selected video segments consist of a total un-compacted length of 83.00 seconds but when compacted according to constraint equation (2) consist of a compacted length of 42.58 seconds, a compaction ratio of 49%. Referring to column 905, video segment 925 which corresponds to the largest individual video frame is not compacted because it is identified as having the highest importance. Video segment 921 which is associated with the largest feature vector however is in a smaller individual frame 411 and thus has a compaction ratio of 74% reducing the length of the segment from 28.00 seconds to only 7.28 seconds using constraint equation (2).

Alternatively, compacting the same five video segments using constraint equation (3) results in compacted length of 63.05 seconds. Referring to column 907, video segment 925 which corresponds to the largest individual video frame is not compacted because it is identified as having the highest importance. Video segment 921 which is associated with the largest feature vector, however, is in a smaller individual frame 411 (FIG. 4) and thus has a compaction ratio of 45% reducing the length of the segment from 28.00 seconds to 15.30 seconds using constraint equation (3).

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for producing a video collage, comprising the steps of:
    segmenting a video into a plurality of video segments based upon global properties of the entirety of said video;
    providing a video collage template having at least one individual video frame;
    associating a video segment from said plurality of video segments with said individual video frame of said video collage template; and,
    producing a video collage from said video collage template and said associated video segment.

2. The method of claim 1, wherein said step of associating a video segment from said plurality of video segments includes the steps of:
    selecting a plurality of video segments from said plurality of video segments; and,
    associating each of said selected plurality of video segments with a respective individual frame of said video collage.

3. The method of claim 1, wherein said step of associating a video segment from said plurality of video segments includes the steps of:
    providing a plurality of representative images, wherein each representative image represents one of said plurality of video segments;
    selecting a representative image from said plarality of representative images; and
    associating said representative image with said individual video frame of said video collage template.

4. The method of claim 1, further including the step of:
    providing a. video segment template, wherein said video segment template contains a plurality of representative images, wherein each representative image is associated with one of said plurality of video segments; and,
    wherein said step of associating a video segment includes associating a representative image from said plurality of representative images with said individual video frame of said video collage template.

5. The method of claim 1, wherein said step of segmenting said video includes segmenting said video into a selected number of segments.

6. The method of claim 1, wherein said step of segmenting said video includes segmenting said video using a Genetic Segmentation Algorithm ("GSA").

7. The method of claim 1 further including the step of compacting said associated video segment.

8. The method of claim 7 wherein said step of compacting includes the steps of:
    assigning an importance value to said video segment;
    assigning a feature vector to said video segment; and,
    truncating a portion of said video segment based on said importance value and said feature vector.

9. The method of claim 8 wherein the importance value relates to a size of said individual video frame with which said video segment is associated.

10. The method of claim 8 wherein the feature vector relates to a content activity of said video segment.

11. A video collage, comprising:
    a video collage template having at least one individual video frame; and,
    a representative image associated with a video segment, wherein said representative image is contained in said at least one individual video frame, and wherein the video segment is one of a plurality of video segments based upon global properties of the entirety of a video.

12. The video collage of claim 11, wherein said video segment associated with said representative image may be viewed by selecting said representative image.

13. The video collage of claim 11, wherein said video collage has a plurality of individual video frames, and wherein said plurality of individual video frames each contain a representative image, wherein each representative image is associated with a video segment.

14. The video collage of claim 11, wherein said representative image is assigned an importance value based on a size of said individual video frame in which said representative image is contained.

15. The video collage of claim 14, wherein a length of said video segment associated with said representative image is reduced based on said importance value.

16. The video collage of claim 11, wherein said representative image is associated with a feature vector.

17. A video collage, comprising:
    a video collage template having at least one individual video frame; and
    a representative image associated with a video segment, wherein said representative image is contained in said at least one individual video frame and is associated with a feature vector;
    wherein a value of said feature vector is determined based on a size of said individual video frame and a content activity of said associated video segment.

18. A video collage, comprising:
    a video collage template having at least one individual video frame; and,
    a representative image associated with a video segment, wherein said representative image is contained in said at least one individual video frame and is associated with a feature vector;
    wherein a length of said representative image is reduced based on a value of said feature vector.

19. A video collage user interface, comprising:
    a video collage template having at least one individual video frame;
    a video segment template including a plurality of representative images, wherein each representative image is associated with a video segment; and,
    a video segment selection device, wherein a plurality of video segments are selected based upon global properties of the entirety of a video.

20. The video collage user interface of claim 19, wherein said video segment selection device is used for selecting a representative image and inserting said selected representative image into said at least one individual video frame.

21. An apparatus for producing a video collage, comprising:
 a processor; and
 a processor readable storage medium in communication with said processor, containing processor readable program code for programming the apparatus to:
  segment a video into a plurality of video segments wherein the plurality of video segments are selected based upon global properties of the entirety of the video;
  provide a video collage template having at least one individual video frame;
  associate a video segment from said plurality of video segments with said individual video frame of said video collage template; and,
  produce a video collage from said video collage template and said associated video segment.

22. The apparatus of claim 21, wherein said processor readable program code for programming the apparatus to associate a video segment from said plurality of video segments includes processor readable program code for programming the apparatus to:
 select a plurality of video segments from said plurality of video segments; and,
 associate said selected plurality of video segments with a respective individual video frame of said video collage template.

23. The apparatus of claim 21, wherein said processor readable program code for programming the apparatus to segment a video includes processor readable program code for programming the apparatus to:
 segment said video into a selected number of segments.

24. The apparatus of claim 21, wherein said processor readable program code for programming the apparatus to segment a video includes processor readable program code for programming said apparatus to:
 segment said video using a Genetic Segmentation Algorithm ("GSA").

25. The apparatus of claim 21 further including processor readable program code for programming said apparatus to:
 compact said associated video segment.

26. An apparatus for producing a video collage, comprising:
 a processor;
 a processor readable storage medium in communication with said processor, containing processor readable program code for programming the apparatus to:
  segment a video into a plurality of video segments;
  provide a video collage template having at least one individual video frame;
  associate a video segment from said plurality of video segments with said individual video frame of said video collate template;
  produce a video collage from said video collage template and said associated video segment; and
  program said apparatus to compact said associated video segment wherein said processor readable program code for programming said apparatus to compact said associated video segment includes processor readable program code for programming said apparatus to:
 assign an importance value to said associated video segment;
 assign a feature vector to said associated video segment; and, truncate a portion of said associated video segment based on said importance value and said feature vector.

27. A method for producing a video collage, comprising the steps of:
 segmenting a video into a plurality of video segments;
 providing a video collage template having at least one individual video frame;
 associating a video segment from said plurality of video segments with said individual video frame of said video collage template, wherein said associating step further comprises:
  providing a plurality of representative images, wherein each representative image represents one of said plurality of video segments;
  selecting a representative image from said plurality of representative images; and
  associating said representative image with said individual video frame of said video collage template;
 compacting said associated video segment, wherein said step of compacting includes the steps of:
  assigning an importance value to said video segment;
  assigning a feature value to said video segment; and,
  truncating a portion of said video segment based on said importance valve and said
  feature vector; and
 producing a video collage from said video collage template and said associated video segment.

28. A method for producing a video collage, comprising the steps of:
 segmenting a video into a plurality of video segments;
 providing a video collage template having at least one individual video frame;
 associating a video segment from said plurality of video segments with said individual video frame of said video collage template, wherein said associating step further comprises:
  providing a plurality of representative images, wherein each representative image represents one of said plurality of video segments;
  selecting a representative image from said plurality of representative images; and
  associating said representative image with said individual video frame of said video collage template;
 compacting said associated video segment wherein said step of compacting includes the steps of:
  assigning an importance value to said video segment, wherein the importance value relates to a size of said individual video frame with which said video segment is associated;
  assigning a feature vector to said video segment, wherein the feature vector relates to a content activity of said video segment; and,
  truncating a portion of said video segment based on said importance value and said feature vector; and
 producing a video collage from said video collage template and said associated video segment.

29. A video collage, comprising:
 a video collage template having at least one individual video frame;
 a representative image contained in said at least one individual video frame and associated with a video segment, wherein said video segment is viewable by selecting said representative image;

a importance value assigned to said representative image and based on a size of said individual video frame in which said representative image is contained; and a feature vector associated with the representative image, wherein said feature vector is determined based on a size of said individual video frame and a content activity of said associated video segment.

30. A video collage, comprising;

a video collage template having at least one individual video frame;

a representative image contained in said at least one individual video frame and associated with a video segment, wherein said video segment is viewable by selecting said representative image;

a importance value assigned to said representative image and based on a size of said individual video frame in which said representative image is contained; and a feature vector associated with the representative image, wherein said feature vector is determined based on a size of said individual video frame and a content activity of said associated video segment, and wherein a length of said representative image is reduced based upon a value of said feature vector.

31. An apparatus for producing a video collage, comprising:

a processor;

a processor readable storage medium in communication with said processor, containing processor readable program code for programming the apparatus to:

segment a video into a plurality of video segments using a Genetic Segmentation Algorithm ("GSA");

provide a video collage template having at least one individual video frame;

associate a video segment from said plurality of video segments with said individual video frame of said video collage template;

assign an importance value to said associated video segment;

assign a feature vector to said associated video segment;

truncate a portion of said associated video segment based on said importance value and said feature vector; and, produce a video collage form said video collage template and said associated video segment.

* * * * *

UNITED STATES PATENT AND TRADEMARK OFFICE
CERTIFICATE OF CORRECTION

PATENT NO. : 7,203,380 B2
APPLICATION NO. : 09/992617
DATED : April 10, 2007
INVENTOR(S) : Chiu et al.

Page 1 of 1

It is certified that error appears in the above-identified patent and that said Letters Patent is hereby corrected as shown below:

Column 11, line 39, of Claim 3: Delete "ofrepresentative" and insert therefor --of representative--;

Column 11, line 42, of Claim 3: Delete "plarality" and insert therefor --plurality--;

Column 11, line 48, of Claim 4: Delete "a. video" and insert therefor --a video--;

Column 13, line 54, of Claim 26: Delete "collate" and insert therefor --collage--;

Column 14, line 22, of Claim 27: Delete "value" and insert therefor --vector--;

Column 14, line 24, of Claim 27: Delete "valve" and insert therefor --value--;

Column 15, line 8, of Claim 30: Delete "comprising;" and insert therefor --comprising:--; and Column 16, line 21, of Claim 31: Delete "form" and insert therefor --from--.

Signed and Sealed this

Twelfth day of June, 2007

JON W. DUDAS
*Director of the United States Patent and Trademark Office*